(12) United States Patent
Levine et al.

(10) Patent No.: US 9,504,213 B2
(45) Date of Patent: Nov. 29, 2016

(54) SMART SPRINKLER SYSTEM WITH VARIABLE SCHEDULING AND RADAR-BASED RAINFALL INFORMATION

(71) Applicants: Michael R. Levine, Pinckney, MI (US); Luke Dickens, Fortson, GA (US)

(72) Inventors: Michael R. Levine, Pinckney, MI (US); Luke Dickens, Fortson, GA (US)

( * ) Notice: Subject to any disclaimer, the term of this patent is extended or adjusted under 35 U.S.C. 154(b) by 138 days.

(21) Appl. No.: 13/966,869

(22) Filed: Aug. 14, 2013

(65) Prior Publication Data
US 2014/0148959 A1    May 29, 2014

Related U.S. Application Data

(60) Provisional application No. 61/729,842, filed on Nov. 26, 2012.

(51) Int. Cl.
A01G 25/16    (2006.01)

(52) U.S. Cl.
CPC ............. *A01G 25/16* (2013.01); *A01G 25/165* (2013.01)

(58) Field of Classification Search
None
See application file for complete search history.

(56) References Cited

U.S. PATENT DOCUMENTS

| | | | | |
|---|---|---|---|---|
| 3,886,378 | A * | 5/1975 | Morgan | 307/141.4 |
| 5,761,312 | A * | 6/1998 | Zelikovitz et al. | 380/257 |
| 6,314,340 | B1 * | 11/2001 | Mecham et al. | 700/284 |
| 6,452,499 | B1 | 9/2002 | Runge et al. | |
| 7,552,632 | B2 | 6/2009 | Runge et al. | |
| 7,949,433 | B2 | 5/2011 | Hern et al. | |
| 7,996,192 | B2 | 8/2011 | Repelli et al. | |
| 8,265,797 | B2 | 9/2012 | Nickerson et al. | |
| 2003/0093159 | A1 * | 5/2003 | Sieminski | 700/12 |
| 2005/0273205 | A1 * | 12/2005 | Nickerson | A01G 25/16 700/284 |
| 2006/0100747 | A1 | 5/2006 | Runge et al. | |
| 2007/0293990 | A1 | 12/2007 | Alexanain | |
| 2008/0027586 | A1 * | 1/2008 | Hern et al. | 700/284 |
| 2008/0147205 | A1 * | 6/2008 | Ollis et al. | 700/11 |
| 2008/0234870 | A1 * | 9/2008 | Chalemin et al. | 700/284 |
| 2009/0316671 | A1 * | 12/2009 | Rolf et al. | 370/338 |
| 2011/0224836 | A1 | 9/2011 | Hern et al. | |
| 2011/0237227 | A1 | 9/2011 | Kemery et al. | |
| 2012/0035898 | A1 | 2/2012 | Repelli et al. | |
| 2012/0215366 | A1 | 8/2012 | Redmond et al. | |
| 2012/0229284 | A1 | 9/2012 | Hern et al. | |
| 2012/0239211 | A1 | 9/2012 | Walker et al. | |

FOREIGN PATENT DOCUMENTS

| | | |
|---|---|---|
| EP | 2201834 A1 | 6/2010 |
| EP | 2342965 A1 | 7/2011 |
| EP | 2354878 A1 | 8/2011 |
| WO | WO-9948354 A1 | 9/1999 |
| WO | WO-2005062961 A2 | 7/2005 |
| WO | WO-2007149949 A1 | 12/2007 |
| WO | WO-2009002757 A2 | 12/2008 |
| WO | WO-2011044289 A1 | 4/2011 |

* cited by examiner

*Primary Examiner* — Mohammad Ali
*Assistant Examiner* — Bernard G Lindsay
(74) *Attorney, Agent, or Firm* — Patents on Demand, P.A.; Brian K. Buchheit; Scott M. Garrett

(57) ABSTRACT

A sprinkler system is controlled to ensure that a given geographic area receives sufficient watering without being over-watered. The sprinkler system, capable of being programmed to deliver a desired amount of water in accordance with a desired daily watering schedule, is programmed to deliver the desired amount of water every day unless interrupted. Rainfall information is received, and a signal is sent to interrupt the sprinkler system, causing the sprinkler system to: a) follow a predetermined watering schedule when there is no rain, in which case the sprinkler system delivers the desired amount of water following a predetermined number of days, n, without watering, or b) increase n by 1 or more days if the rainfall information indicates at least one significant rain event capable of providing the desired amount of water, and c) return to a) when n expires.

61 Claims, 6 Drawing Sheets

FIG − 4

SMART SPRINKLER SYSTEM WITH VARIABLE SCHEDULING AND RADAR-BASED RAINFALL INFORMATION

REFERENCE TO RELATED APPLICATIONS

This application claims priority to U.S. Provisional Patent Application Ser. No. 729,842, filed Nov. 26, 2012, the entire content of which is incorporated herein by reference.

FIELD OF THE INVENTION

This invention relates generally to the irrigation of land and, in particular, to a sprinkler system and method that uses radar data to provide adequate watering without over-watering. The invention relies on the existing sprinkler timer to perform the daily watering schedule (in the preferred embodiment), but conserves water by having the capability to perform automatic watering on any day, without any fixed pattern, thereby reducing the frequency of days that watering occurs.

BACKGROUND OF THE INVENTION

Modern irrigation systems, such as lawn sprinklers, usually include multiple watering zones. The user typically sets an irrigation control timer to set the frequency and duration of watering for those zones. At the pre-programmed time, the system cycles through the various watering zones.

Simple irrigation systems often waste water because the programmed watering time occurs immediately before, during or after a natural rainstorm event. More expensive systems address this problem by employing a rain sensor. After a set amount of rain has fallen, the sensor engages a switch that will prevent the timer from watering (e.g., http://www.rainbird.com/landscape/products/controllers/RSD.htm). U.S. Pat. No. 7,949,433 describes the use of a rain threshold to enable or disable power to an irrigation system. An interface unit is connected in series with the common line of the sprinkler activation lines. When the interface unit determines or receives an indication that a rain threshold has been exceeded and/or that other criteria have been met, the interface unit inhibits the switching device, breaking the common line. This effectively disables all electrical signals via the activation lines to the valves, until the switch is closed. In this way, the irrigation control timer 30 is not aware that the watering has been interrupted or overridden.

One significant drawback of rain sensors is that, since they have no weather prediction or forecast capability, they ignore rainfall that occurs soon (i.e., within 24-hours) after the programmed watering time. If this happens, over-watering occurs and water is wasted. The cost of water in numerous urban areas has led to more sophisticated and purportedly effective irrigation solutions, some of which take weather predictions and forecasting into account.

Another drawback of rain sensors is that they are restricted to watering only on a fixed pattern of days (usually on specific days of the week) set by the sprinkler timer. This is inherently sub-optimal, since watering may be forced to occur shortly after a recent rain event, in order to ensure that enough watering occurs before the next allowable watering day.

U.S. Pat. No. 7,883,029 discloses an irrigation system including a radio transmitter station that transmits weather prediction information to a geographic region that includes multiple geographic sub-regions. The weather prediction information includes a respective geographic sub-region code for each of the geographic sub-regions for which a weather forecast predicts rain within a predetermined time period. An irrigation apparatus in a particular sub-region activates to water a watering zone at a schedule time. However, if the irrigation apparatus receives the sub-region code for the particular sub-region where the irrigation apparatus is located, the irrigation apparatus does not immediately activate to water the watering zone in one embodiment. The transmitter station may transmit both program content and data content on a common radio frequency signal wherein the data content includes the weather prediction information.

The use of weather information via the Internet for sprinkler control has been suggested before, as in the OpenSprinkler project: http://rayshobby.net/?page_id=160&http://rayshobby.net/blog/?p=1500. Other systems take advantage of radar data. U.S. Pat. No. 6,850,819, for example, resides in an irrigation control system that comprises a meter to measure one or more weather conditions, a monitor to examine rainfall data derived from radar scanning and to extract data which is representative of the scanned rainfall; and a controller to calculate a moisture content value, a predetermined moisture content value, and regulate irrigation in accordance with the computed values.

SUMMARY OF THE INVENTION

This invention resides in a system and method for controlling a sprinkler system to ensure that a given geographic area receives sufficient watering without being over-watered. In the preferred embodiments, the sprinkler system is capable of being programmed to deliver a desired amount of water in accordance with a desired daily watering schedule comprised of watering zone start times and watering zone durations.

In accordance with the method, the sprinkler system is programmed to deliver the desired amount of water every day unless interrupted. Rainfall information associated with the geographical location of the sprinkler system is received, and a signal is sent to interrupt the sprinkler system, causing the sprinkler system to:
  a) follow a predetermined watering schedule when there is no rain, in which case the sprinkler system delivers the desired amount of water following a predetermined number of days, n, without watering, or
  b) increase n by 1 or more days if the rainfall information indicates at least one significant rain event capable of providing the desired amount of water, and
  c) return to a) when n expires.

Watering decisions are typically sent to the sprinkler system on a daily basis, and the predetermined watering schedule is delayed by one full day (i.e., 24-hrs), if the rainfall information indicates a significant rain event. The predetermined watering schedule may have the form: do not water for x days, then water on the next day; and the delay of the predetermined watering schedule has the form: do not water for x+n days, then water on the next day, where n is between 1 and 7. Multiple no-rain watering schedules may be in effect for different daily time periods. In the preferred embodiment, the signal to interrupt the sprinkler system is sent from a geographically remote site or service center, enabling a plurality of systems to be controlled in the same or different geographic locations.

The rainfall information may be historical, forecast, or a combination thereof. As an example, the predetermined watering schedule may be delayed if the rainfall information indicates that the desired amount of water has been received in the last n days, where n is between 1 and 7. As another example, the predetermined watering schedule may be delayed if the rainfall information forecasts a high probability that the desired amount of water will be received as rainfall in the next n hours, wherein n is between 1 and 24. As a more specific example, the predetermined watering schedule may be delayed if an area forecast indicates that there is a strong probability of a significant rain event in the next 24 hours, or if weather radar indicates an existing or oncoming storm. The predetermined watering schedule may be immediately delayed upon the occurrence of a significant rain event.

The sprinkler system may be an electromechanical type sprinkler system including a rotating dial with adjustable pins, in which case the pins are adjusted to deliver the desired amount of water every day. Alternatively, the sprinkler system may be an electronic sprinkler system including a programming interface, in which case the system is reprogrammed through the interface to deliver the desired amount of water every day. The electronic sprinkler system may include a programming interface enabling a plurality of different timing programs to be set for different watering zones, in which case the different timing programs, for different times of the day, may be reprogrammed through the interface to deliver the desired amount of water to each of the different watering zones on a daily basis.

The rainfall information is radar-based, and/or may use soil moisture data associated with the geographic area and/or rain gauge data associated with the geographic area. In any case, the rainfall information may be derived through the Internet. Zip Code information may be used to determine the geographic area associated with the sprinkler system.

If the sprinkler system has a rain sensor input, an interface may be provided to the rain sensor input to follow or delay the predetermined watering schedule in accordance with the signal received to interrupt the sprinkler system. In the preferred embodiments, the invention inhibits or allows electrical power to a pre-existing electromechanical or electronic sprinkler timer. The control apparatus may connect directly to the sprinkler system through a rain sensor input. In this case, only power to the solenoids is interrupted. Otherwise, the apparatus is connected to the sprinkler system through the electrical wiring providing power to the sprinkler timer unit, and power to both the timer and the solenoids is interrupted. Thus, as disclosed herein, unless otherwise specified, when referring to electrical power to the sprinkler system, it is inferred to mean either power to only the solenoids of the sprinkler system, or power to both the solenoids and the timer of the sprinkler system.

The signal to interrupt the sprinkler system may be delivered through the Internet. In accordance with one disclosed example, the signal from a remote site may be sent to an electronic module at the location of the sprinkler system through the Internet, then wirelessly transmitted from the electronic module to the sprinkler system, or wirelessly transmitted the signal from the electronic module to a sprinkler system power controller via WiFi. In an alternative embodiment, the signal to the sprinkler system may be sent from a remote site using a dial-up telephone connection, with Caller-ID optionally being used for identification purposes.

The desired amount of water, the predetermined watering schedule, or both, may be determined through empirical observation associated with the effectiveness of the sprinkler system and/or determined through soil type, vegetation type, climate or other information associated with the geographic area.

A system for controlling a sprinkler system capable of being programmed to deliver a desired amount of water in accordance with a desired daily watering schedule comprised of watering zone start times and watering zone durations, and wherein the sprinkler system is intentionally programmed to deliver the desired amount of water every day unless interrupted, comprises a processor receiving rainfall information associated with the geographical location of the sprinkler system, and a communications interface connected to the processor, the communications interface being operative to send a signal to the sprinkler system to interrupt the sprinkler system, causing the sprinkler system to:

a) follow a predetermined watering schedule when there is no rain, in which case the sprinkler system delivers the desired amount of water following a predetermined number of days, n, without watering, or b) increase n by 1 or more days if the rainfall information indicates at least one significant rain event capable of providing the desired amount of water, and c) return to a) when n expires.

In accordance with a method aspect, the sprinkler timer is set to water every day, regardless of whether the timing is set mechanically (i.e., via pins) or electronically. The system then automatically inhibits watering for any given 24-hour period by interrupting power to the sprinkler system based on the acquired rainfall information.

DETAILED DESCRIPTION OF THE INVENTION

This invention resides in a Smart Sprinkler System (SSS) that uses rainfall information, from radar and other weather data obtained from the Internet, to send a control signal to a sprinkler system power controller that will either interrupt or enable power to the sprinkler system. No local weather sensors or intelligence are required at the sprinkler system site and the device may be used in conjunction with existing sprinkler timers. From the Internet, historical radar and other weather information, in addition to forecast precipitation information is used to make a decision to enable or disable the solenoids of the sprinkler system. An algorithm which compares the rainfall amount of the last several days and predicted rainfall for the next day(s), to a required rainfall threshold, will determine the decision to water. There is one sprinkler system power controller per sprinkler timer. The algorithm decision (enable power=water, or disable power=do not water) is transmitted to each sprinkler power controller, which then enables/disables watering accordingly by controlling sprinkler system power.

System Overview

Figure 1:
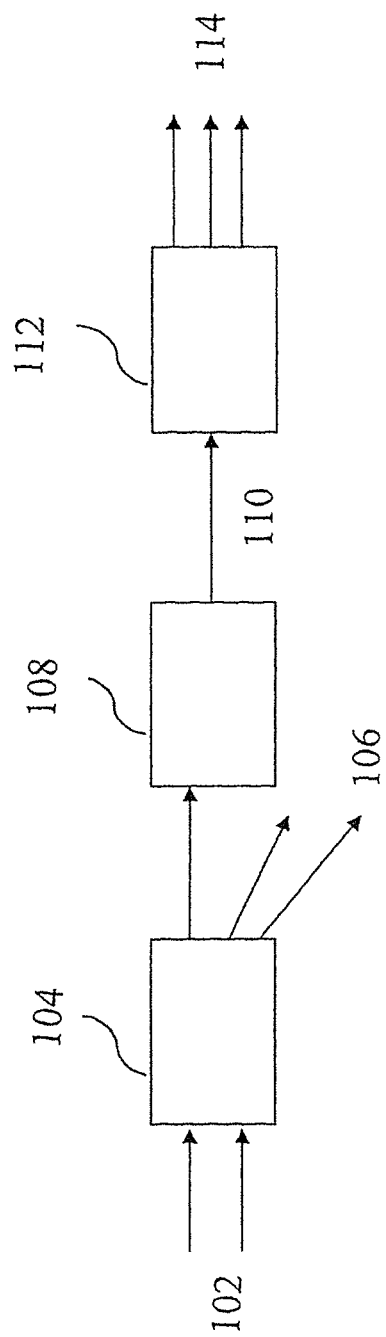
FIG. 1 is a block diagram that illustrates an overview of the system.

FIG. 1 is a block diagram that illustrates an overview of the system. In broad and general terms, the system includes at least one service center 104 receiving weather information 102. The service center 104 sends out sprinkler ON/OFF (i.e., activation/deactivation signals) 106 to a plurality of sprinkler controllers 108. The sprinkler controllers, in turn, enable/disable power according to the ON/OFF signals 110 to the sprinkler solenoids (or both solenoids and timer) 112 operative to activate sprinkler zones 114. Each of these subsystems will now be described in further detail, as there are multiple alternative embodiments in each case.

Service Center

The intelligence of the SSS resides at the Service Center. It is anticipated that there will be at least one service center associated with a given geographical area, and that each geographical area will include numerous commercial or residential sprinkler timers controlled by each center. While a given Service Center may include human personnel, in the preferred embodiment, all control signals are sent out entirely on an automated basis.

At each Service Center, local radar rainfall data, forecast information, and other weather data are collected from the Internet on a daily basis. The radar images are converted to rainfall rates using known conversion methods. As discussed elsewhere herein, the predicted rates may be corrected by available rain gauge data and/or other weather information. Historical and predicted rainfall information are used to decide whether or not to allow watering at each location that is timer-controlled by the system, and the decisions are delivered via signals 106, shown in FIG. 1.

A primary source of precipitation information for a user's site will be from radar images for the user's location, obtained over the Internet. There are now different types of radar images available, and the invention is not limited in terms of acquisition technology. Some images use Base Reflectivity, which is a display of echo intensity (reflectivity) measured in dBZ (decibels of Z, where Z represents the energy reflected back to the radar). Base Reflectivity images are available at several different elevation angles (tilts) of the antenna and are used to detect precipitation, evaluate storm structure, locate atmospheric boundaries and determine hail potential. Other image types use Composite Reflectivity, which displays maximum echo intensity (reflectivity) from any elevation angle at every range from the radar; One-Hour Precipitation, which is an image of estimated one-hour precipitation accumulation on a 1.1 nm by 1 degree grid, is used to assess rainfall intensities for flash flood warnings, urban flood statements and special weather statements; Storm Total Precipitation is an estimate of accumulated rainfall, continuously updated, since the last one-hour break in precipitation. This product is used to locate flood potential over urban or rural areas, estimate total basin runoff and provide rainfall accumulations for the duration of the event; and services similar to StormTrac (cbs12.com/weather/features/animating-radar) which provides near-term prediction of where a rain cell will be in the next several hours.

Figure 2:
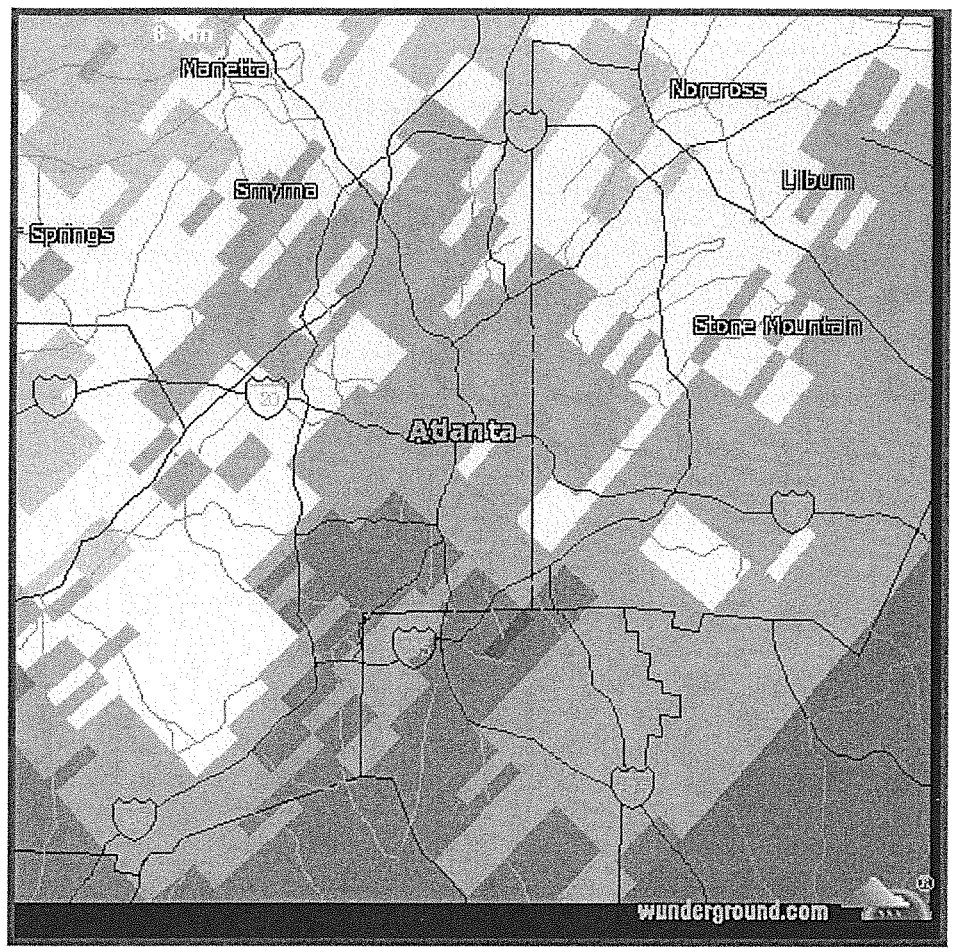
FIG. 2 is a sample radar image from the Weather Underground website.
Figure 3:
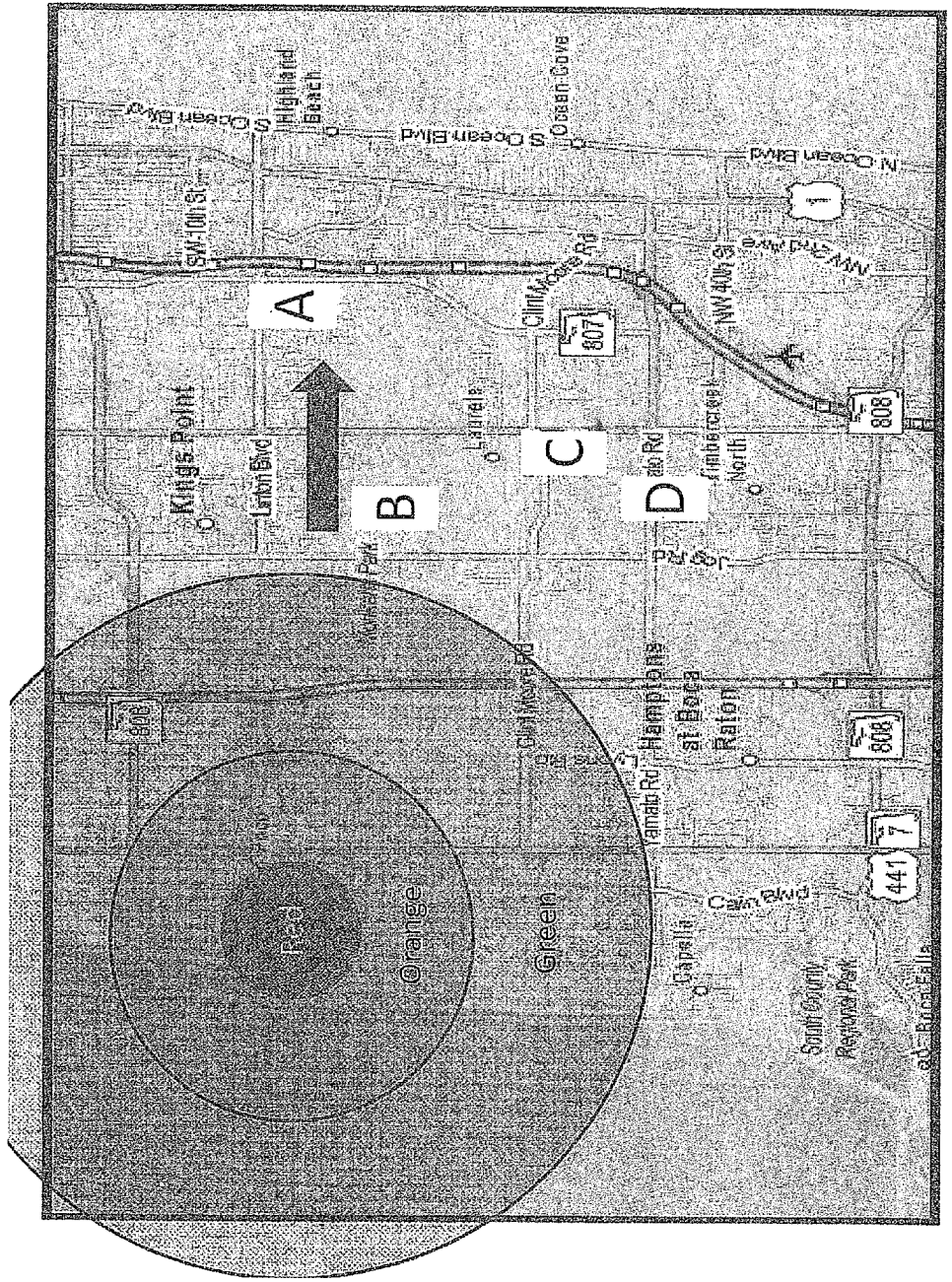
FIG. 3 illustrates how each radar frame represents reflectivity from the sky above a particular geographic location.

Again, the invention is not limited in terms of the radar technology, and may use any available imagery, including yet-to-be developed, higher-resolution modalities. Using Base Reflectivity as an example, the input to the system is the analyzed radar image (dBZ intensity), with the output being average color which is indicative of estimated rainfall. The colors of the pixel(s) in the images represent radar reflectivity values measured in dBZ. These values are then converted into rainfall rates (see: desktopdoppler.com/help/nws-nextrad.htm). FIG. 2 is a sample radar image from the Weather Underground website (www.wunderground.com). On a periodic basis, for example every 5 minutes, a frame of data is downloaded from the website, and each frame represents the radar reflectivity from the sky above a particular geographic location, as shown in FIG. 3.

Figure 4:
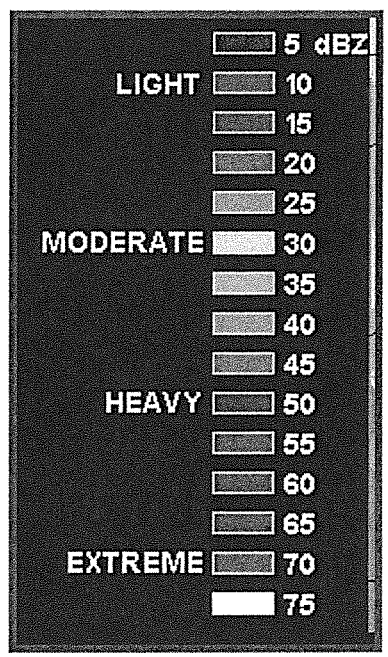
FIG. 4 is the NOAA's table of conversion from dbZ to rainfall.

FIG. 4 is the NOAA's table of conversion from dbZ to rainfall. Each color translates dBZ to a numerical value, and each numerical value is added to the daily summary. In accordance with the invention, each day, the system generates an estimated rainfall for a plurality of geographical regions.

Zip Code Information

The user's Zip Code (Zip+4) can be used to identify the user's location and default soil/grass type.

Decision Algorithm

The algorithm makes decisions based on recent watering events, or whether or not a quantum of rain has recently fallen or is predicted to occur within 24-hrs. A quantum of rain is defined as the output of a typical sprinkler head during a watering event and is proportional to the duration of a watering event. This value will be adjustable by the user according to individual watering desires. A combination of both historical and forecast precipitation (and other weather information) will be used to decide whether to water on a given day.

The sprinkler timer will be set to water every day of the week. This means that the system is not limited to a fixed pattern of watering and is able to water on any day, i.e. has a variable pattern. Because of the this capability, incorrect rain predictions have little real effect on watering efficiency, since watering will occur the following day, due to the lack of historical rain. In fact, it can be shown that this ability to water on any day is inherently superior to any system that has a fixed pattern of watering. To demonstrate this, consider a lawn that requires watering only once every seven days. Here is an illustration of watering frequency, comparing a system using a fixed pattern of watering vs. a system using a variable pattern of watering:

The following examples have the following parameters in common:
 The area to be watered requires at least a quantum of water every seven days.
 The fixed pattern system is only permitted to water every seventh day.
 The variable pattern system may water on any day.

Example 1

| Day: | 1 | 2 | 3 | 4 | 5 | 6 | 7 |
|---|---|---|---|---|---|---|---|
| Fixed: | Watering | | | | | | |
| Variable: | Watering | | | | | | |
| Day: | 8 | 9 | 10 | 11 | 12 | 13 | 14 |

-continued

| | |
|---|---|
| Fixed: | Watering |
| Variable: | Watering |

| Day: | 15 | 16 | 17 | 18 | 19 | 20 | 21 |
|---|---|---|---|---|---|---|---|
| Fixed: | Watering | | | | | | |
| Variable: | Watering | | | | | | |

Example 1 compares what would happen in both systems under drought conditions with no rain. The watering events are identical. This example illustrates that the variable pattern employed by the invention performs no worse than the fixed pattern under drought conditions.

Example 2

| Day: | 1 | 2 | 3 | 4 | 5 | 6 | 7 | 8 | |
|---|---|---|---|---|---|---|---|---|---|
| Fixed: | Watering | | | | | | | Watering | |
| Variable: | Watering | | | | | | | Watering | |
| Day: | 9 | 10 | 11 | 12 | 13 | 14 | 15 | 16 | 17 |
| Fixed: | | | | | | | Watering | | |
| Variable: | | | | | | | | | |
| | | | | Day: | | 18 | 19 | 20 | 21 |
| | | | | Fixed: | | Watering | | | |
| | | | | Variable: | | | | | |

In Example 2, it rained at least a quantum of water on the eleventh day (indicated by shading). The fixed pattern system must water on the $15^{th}$ day, since the next opportunity to water would be on the $22^{nd}$ day, and that would result in an unacceptable period without water (i.e., 14 days). Since the variable pattern system can water on any day, it delays watering until the $18^{th}$ day, already an improvement over the fixed pattern system.

Example 3

| Day: | 1 | 2 | 3 | 4 | 5 | 6 | 7 | 8 | 9 |
|---|---|---|---|---|---|---|---|---|---|
| Fixed: | Watering | | | | | | | Watering | |
| Variable: | Watering | | | | | | | | |
| Day: | 10 | 11 | 12 | 13 | 14 F | 15 | 16 | 17 | 18 |
| Fixed: | | | | | | Watering | | | |
| Variable: | | | | | | | | | |
| | | | | | Day: | | 19 | 20 | 21 |
| | | | | | Fixed: | | | | |
| | | | | | Variable: | | | | |

In Example 3, on the $14^{th}$ day, rain was forecast for the $15^{th}$ day (indicated by the letter 'F'). The forecast was correct and it rained on the $15^{th}$ day (indicated by shading). It is observed that the variable pattern system is able to skip watering on the $15^{th}$ day. This results in a delay in watering until the $22^{nd}$ day. The fixed pattern system must water on the $15^{th}$ day.

Example 4

| Day: | 1 | 2 | 3 | 4 | 5 | 6 | 7 |
|---|---|---|---|---|---|---|---|
| Fixed: | Watering | | | | | | |
| Variable: | Watering | | | | | | |

| Day: | 8 | 9 | 10 | 11 F | 12 | 13 | 14 F |
|---|---|---|---|---|---|---|---|
| Fixed: | Watering | | | | | | |
| Variable: | | Watering | | | | | |

| Day: | 15 | 16 | 17 | 18 | 19 | 20 | 21 |
|---|---|---|---|---|---|---|---|
| Fixed: | Watering | | | | | | |
| Variable: | | Watering | | | | | |

In Example 4, on the $14^{th}$ day, rain was forecast for the $15^{th}$ day (indicated by the letter 'F'). The forecast was incorrect and it did not rain on the $15^{th}$. This is the worst-case scenario for the variable pattern system. It can be observed that the variable pattern algorithm skips watering on the $15^{th}$. However, watering occurs the following day due to the lack of previous rain, and prevents any practical adverse effect on the irrigated area. This is a "self-healing" property of the variable pattern. The fixed pattern system has no such self-healing capability, since it cannot water until the next scheduled watering day. The possibility of a missed forecast appears to show potential worse performance for the variable pattern system. In reality, however, the overall effect would be de minimus, due to the self-healing property. The water savings resulting from the variable pattern system's capability to maximize delay in watering due to rain (shown in Example 2), a relatively frequent event, will dwarf any minimal savings lost due to the rare occurrence of an erroneous forecast.

The fact that all days are available for watering allows the algorithm to continually delay watering due to rain (or predicted rain) events, and can shift the required watering to the maximum number of days in the future. The Fixed Pattern system cannot always do this, since it cannot perform watering on the optimal day to do so. Therefore, in practice, the variable pattern system must be superior to any fixed pattern system, and the fact that the system can water on any day makes the variable pattern system possible. The SSS requires that all pins be pulled on the wheel that sets the day-frequency of watering on the pre-existing electromechanical sprinkler timer (or the equivalent procedure performed on an electronic timer) to allow for the capability of watering on any day.

A simple example of the decision algorithm is:
IF an area forecast shows a high probability of at least a quantum of rain in the next 24 hrs.,
  Do not Water
OR ELSE IF a StormTrac radar indicates that a rain cell will cause a quantum of rain to fall on the user's location in the next 2 hrs.
  Do not Water
OR ELSE IF watering or rainfall has occurred in the past n days,
  Do not Water
OR ELSE
  Water In the algorithm above, the percentage value used for 'high probability' and the default quantum value may be adjusted as more empirical evidence is gathered. The value of n is the number of days that a quantum of rain has not fallen and has a default value of 2, however, it is also adjustable according to the user's desires. The algorithm may also adjust the number of days to delay watering, proportional to the actual number of quanta of actual rainfall. Other relevant weather information (e.g., temperature, wind) and user information (e.g. soil type, grass type) could be incorporated into the decision algorithm.

Transmission of Control Signals to the Controller

In general, the algorithm decision uses rainfall data information, rain forecast and previous client recorded decisions as inputs to make the next-day decision for each client. Watering decisions are calculated per location, depending on location watering requirement, watering and rainfall history, and rainfall prediction/forecast. These decisions are recorded at the Service Center.

The Service Center then transmits the decision to each Sprinkler System Power Controller at the appropriate time. This scheduled event (e.g., an email or a scheduled Google Calendar event) occurs which, in turn, triggers the Sprinkler Controller. This may be accomplished using a web service, such as IFTTT (If This Then That). In the preferred embodiment, exactly one ON or OFF signal is sent from the Service Center to each client site, every 24 hours, and zone timing is performed by the pre-existing sprinkler timer settings.

Sprinkler System Power Controller (108)

In response to signals received form the Service Center 104, the Sprinkler System Power Controller 108 will inhibit or allow power to the solenoids (or both solenoids and timer) of a sprinkler system equipped with a pre-existing electronic or electromechanical sprinkler timer 112. The Sprinkler System Power Controller connects to the sprinkler system through the rain sensor inputs to the timer, if available. Otherwise, the Sprinkler System Power Controller will be connected to the sprinkler system through standard home circuitry wiring and will control power to the sprinkler system by interrupting the common wire. See http://water-heatertimer.org/How-to-wire-Intermatic-sprinkler-timers.html for examples of electromechanical sprinkler timers with and without rain sensor terminals.

Figure 5:
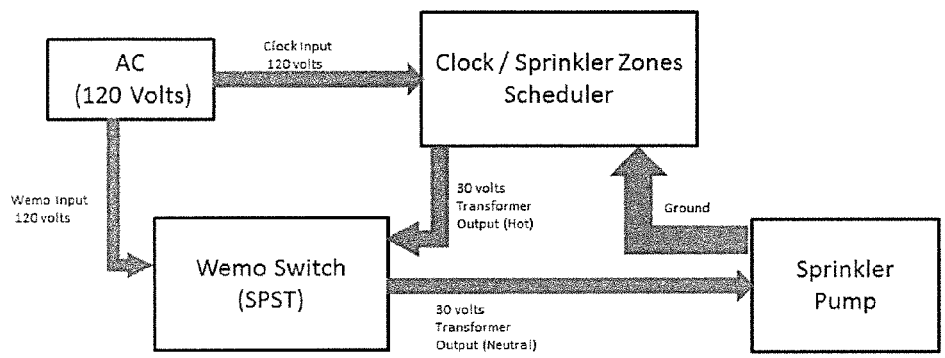
FIG. 5 is a block diagram showing the way in which a WeMo switch may be used to interrupt a sprinkler pump.
Figure 6:
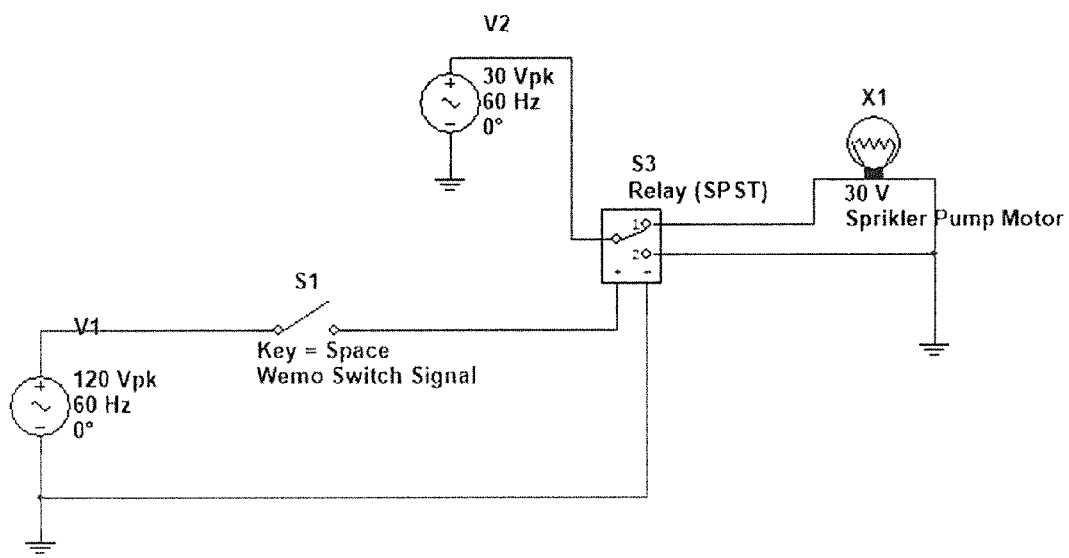
FIG. 6 is an electrical diagram of the block diagram of FIG. 5 showing the BelkinWeMo operating as a simple switch that opens or closes a relay.
Figure 7:
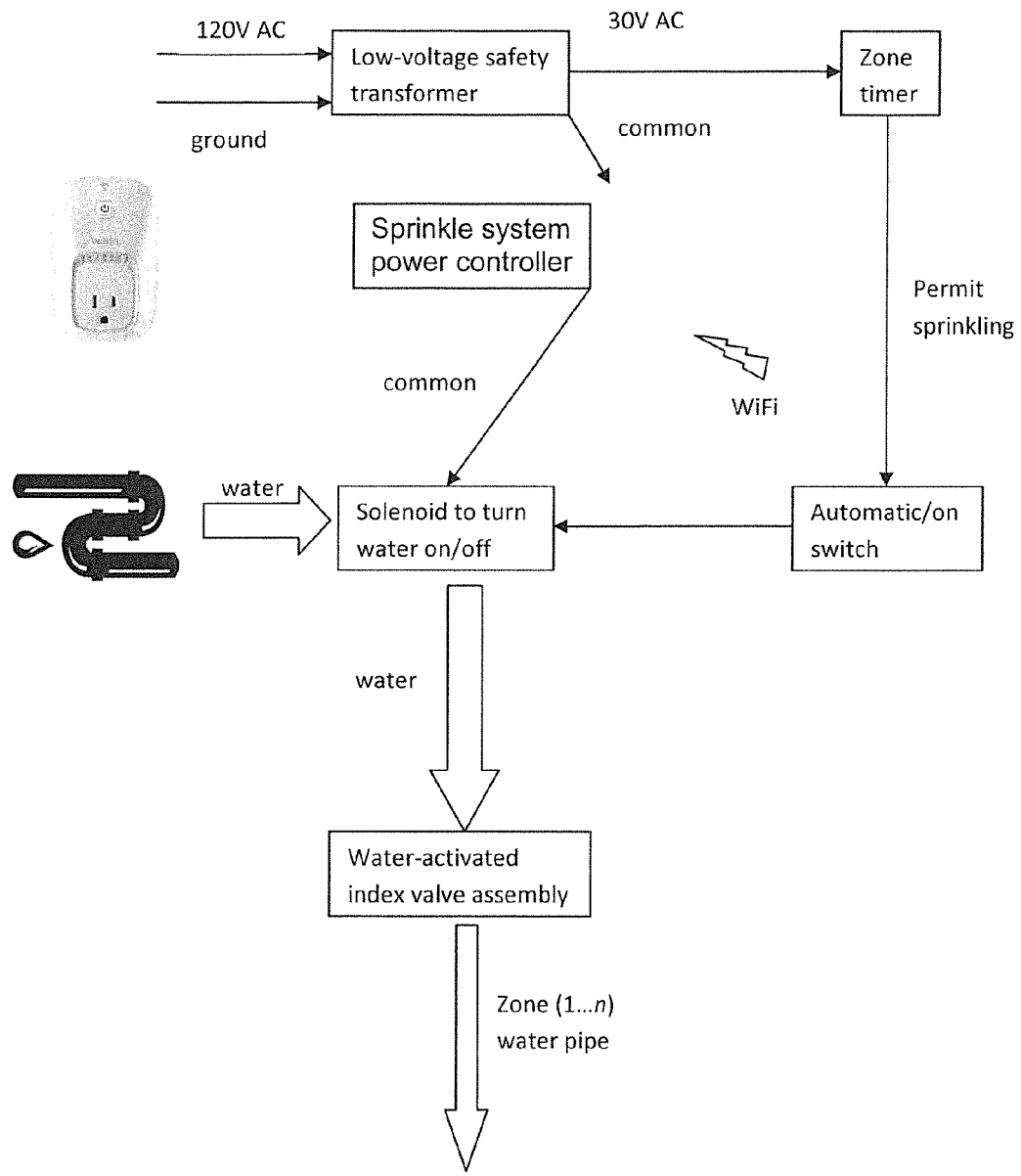
FIG. 7 illustrates the use of a WeMo switch that can interrupt the common wire.

An example of an off-the-shelf device that may be used as a Sprinkler System Power Controller is the BelkinWeMo (http://www.belkin.com/us/wemo-switch). It is designed to interrupt 110V power to a target device. It may be physically modified so that it can be directly tied into the rain sensor inputs of the sprinkler timer. FIG. 5 is a block diagram showing the way in which a WeMo switch may be used to interrupt a sprinkler pump. FIG. 6 is an electrical diagram of the block diagram of FIG. 5 showing the BelkinWeMo operating as a simple switch that opens or closes a relay. FIG. 7 illustrates the use of a WeMo switch that can interrupt the common wire.

Caller ID

To interrupt the sprinkler in accordance with a different aspect of the invention, CallerID may be used. In this embodiment, a message is sent from a particular phone number, and when the message is received, recognition of that phone number enables the sprinkler system. The "content" of the message is immaterial. When the message is received again, recognition of that phone number disables the sprinkler system. If no signals are received in 24 hr period, the system reverts to the predetermined watering schedule when there is no rain, in which case the sprinkler system delivers the desired amount of water following a predetermined number of days, n, without watering. In the preferred implementation of this embodiment, the recognition of a valid CallerID is received (i.e., turn the system ON/OFF), the system automatically takes the phone off-hook momentarily then hangs up. This accomplishes two things. First, this prevents multiple, longer-teen ringing of the phone, and secondly, pick-up and hang-up serves as a confirmation to the caller that the message was indeed received.

Modes of Operation

The sprinkler controller precisely controls watering by allowing or interrupting power to the sprinkler at desired times, based on historical and forecast rainfall and other weather information acquired by the Service Center. Existing mechanical sprinkler systems (e.g., Intermatic: http://www.youtube.com/watch?v=xTONP3Z1Bf8) can operate in one of two modes of operation, ON and AUTO, as dictated by a switch setting on the sprinkler system hardware. Such modes can be simulated using electronic timers (e.g., Rain-Bird: http://www.youtube.com/watch?v=kHqsHSYWTu4). This invention can make use of either mode of operation for any style of controller, though the AUTO mode is preferred.

In the AUTO mode, the sprinkler system power controller inhibits watering by the sprinkler for any 24-hour period by interrupting power to the sprinkler system based the signals received from the Service Center. This is the preferred embodiment. When the system has power, the daily sprinkler timing is controlled by the pre-existing sprinkler timer. The pre-existing sprinkler timer will be set to water every day, and when power is supplied to the sprinkler system in this mode, watering will occur according to the schedule determined by the pins in an electromechanical sprinkler timer or by the schedule programmed into an electronic timer.

In an alternate embodiment, the sprinkler timer is set to the ON mode and causes the sprinkler system to water whenever there is power supplied to the sprinkler system. The sprinkler system power controller precisely controls watering by allowing or interrupting power to the sprinkler in accordance with the signals received from the Service Center. The pre-existing sprinkler timer never controls sprinkler timing; sprinkler individual zone watering is at all times controlled by timed signals from the Service Center.

Example 1

This example pertains to an electronic programmable timer or an electromechanical timer set to AUTO (i.e., watering occurs according to the zone durations set by the pins). In this embodiment, the sprinkler timer schedule is set to water every day of the week and is identical for all days of the week.

The algorithm will either inhibit or permit watering based on historical and/or forecast weather information, and a signal is received from the Internet to open or close the switch in the Sprinkler System Power Controller. The switch closes when watering is desired. The switch opens to inhibit watering.

In order to maintain rotational synchronicity, power to the pre-existing timer is maintained even when power to the sprinklers is interrupted. In the case where a rain sensor is available or where the common wire is interrupted, inhibition of sprinkling for periods of 24-hrs. is preferred since the pre-existing timer can be used for zone timing and only a single pair of ON/OFF signals would be needed when watering for any particular day.

Example 2

This example pertains to an electromechanical timer set to AUTO, where power to the home circuitry is interrupted.

Operation is same as in EXAMPLE 1, except that power interruption must be for 24-hr. periods and zone timing is controlled by the pre-existing sprinkler timer. Power is interrupted to both the sprinkler solenoids and the electromechanical timer. Therefore, power interruption must be for 24-hr. periods so that the timer maintains rotational synchronicity with the 24-hr. cycle.

Example 3

This example pertains to an electromechanical timer set to ON (i.e., the sprinkler continues to water as long as power is supplied; when power is restored after it has been interrupted, the sprinkler indexes to the next zone and continues watering). In this embodiment, the timer settings of the existing sprinkler timer are not used. Instead, all timing is controlled by appropriate power ON/OFF signals sent to the Sprinkler System Power Controller.

In this mode of operation, the Service Center sends timed signals to water in accordance with the desired length of watering time for each zone. The system is initially sent a signal to interrupt power so that watering does not begin until the watering cycle is to start. At the beginning of the watering cycle, power is restored to the system to begin watering the first zone. A power interruption signal is sent at the end of the watering duration for that zone. After a brief interval of time to allow for zone termination, power is restored to the system, causing the system to index to the next zone and resume watering. This process continues until all zones have been completed and the final zone receives its termination signal and interrupts power.

As a fail-safe measure, a daughter board that incorporates a timing circuit may be integrated in this embodiment to prevent the system from excess watering due to a communications failure.

The invention claimed is:

1. A method of controlling a sprinkler system at a geographic location, wherein the sprinkler system is capable of being programmed to deliver a desired amount of water in accordance with a predetermined fixed watering schedule comprised of watering zone start times and watering zone durations, the method comprising the steps of:
   programming the sprinkler system, by the user, with a repeating variable schedule that contains non-sprinkling event days and sprinkling event days, the non-sprinkling event days occurring between the sprinkling event days, and wherein a number "n" is defined as the largest number of sequential non-sprinkling event days in the schedule, and is at least 1;
   receiving radar-based rainfall information on a daily basis associated with the geographical location of the sprinkler system, wherein the rainfall information is historical or forecast, to determine if a rain event is capable of providing the desired amount of water;
   detecting whether rainfall has occurred at the geographic location, based on the rainfall information, that is capable of providing the desired amount of water, including the date of occurrence of the rainfall at the location; and
   responsive to detecting rainfall, automatically shifting the repeating variable schedule so that the next sprinkling event day in the schedule occurs n days from the date of occurrence of the rainfall, and where the repeating variable schedule commences thereafter, thereby ensuring that the location receives either a sprinkling event or a rainfall event at least every n days.

2. The method of claim 1, wherein the repeating variable schedule is shifted in response to a signal from a geographically remote site, and wherein detecting whether rainfall has occurred at the geographic location occurs at the geographically remote site.

3. The method of claim 2, including the step of sending the signal to shift the repeating variable schedule through the Internet.

4. The method of claim 2, including the steps of:
   sending the signal to shift the repeating variable schedule from a remote site to an electronic module at the location of the sprinkler system through the Internet; and
   wirelessly transmitting the signal from the electronic module to the sprinkler system.

5. The method of claim 1, wherein the repeating variable schedule is shifted by interrupting the electrical power to the sprinkler system to prevent operation of a fixed schedule except when the fixed schedule and repeating variable schedule are both scheduled to water.

6. The method of claim 1, wherein the predetermined watering schedule is delayed by one full day if the rain event is capable of delivering the desired amount of water.

7. The method of claim 1, wherein multiple no-rain watering schedules are in effect for different daily time periods.

8. The method of claim 1, wherein n is between 1 and 7.

9. The method of claim 1, further comprising, wherein the-repeating variable schedule is shifted if the rainfall information forecasts a high probability that the desired amount of water will be received as rainfall in the next 1 to 24 hours.

10. The method of claim 1, further comprising, wherein the repeating variable schedule is shifted if an area forecast indicates that there is a strong probability of a significant rain event in the next 24 hours, or if weather radar indicates an existing or oncoming storm.

11. The method of claim 1, wherein the rainfall information is a combination of historical and forecast information.

12. The method of claim 1, further comprising immediately shifting the repeating variable schedule upon the occurrence of a significant rain event.

13. The method of claim 1, wherein the rainfall information is derived through the Internet.

14. The method of claim 1, wherein the rainfall information further includes soil moisture data associated with the geographic area.

15. The method of claim 1, wherein the rainfall information further includes rain gauge data associated with the geographic area.

16. The method of claim 1, including the step of using zip code information to determine the geographic area associated with the sprinkler system.

17. The method of claim 1, wherein:
   the sprinkler system has a rain sensor input, the method further comprising providing an interface to the rain sensor input to follow or shift the repeating variable schedule in accordance with the signal received to interrupt the sprinkler system.

18. The method of claim 1, the method further comprising sending the signal to shift the repeating variable schedule from a remote site to the sprinkler system using a dial-up telephone connection.

19. The method of claim 1, the method further comprising sending the signal to shift the repeating variable schedule from a remote site to the sprinkler system using a recognized phone number.

20. The method of claim 1, wherein:
the repeating variable schedule has the form: do not water for x days, then water on the next day; and
the shift of the repeating variable schedule has the form: do not water for x+n days, then water on the next day, where n is between 1 and 7.

21. The method of claim 1, wherein the desired amount of water, the repeating variable schedule, or both, are determined through empirical observation associated with the effectiveness of the sprinkler system.

22. The method of claim 1, wherein the desired amount of water, the repeating variable schedule, or both, are determined through soil type, vegetation type, climate or other information with the geographic area.

23. The method of claim 1, wherein a remote site controls a plurality of sprinkler systems in the same or different geographic areas.

24. The method of claim 1, including the step of programming the sprinkler system to deliver a desired amount of water on a daily basis unless interrupted.

25. The method of claim 24, wherein:
the sprinkler system is an electromechanical sprinkler system including a rotating dial with adjustable pins; and
the pins are adjusted to deliver the desired amount of water every day.

26. The method of claim 24, wherein:
the sprinkler system is an electronic sprinkler system including a programming interface; and
the system is reprogrammed through the interface to deliver the desired amount of water every day.

27. The method of claim 24, wherein:
the sprinkler system is an electronic sprinkler system including a programming interface enabling a plurality of different timing programs to be set for different watering zones; and
the different timing programs are reprogrammed through the interface to deliver the desired amount of water to each of the different watering zones on a daily basis.

28. The method of claim 1, wherein n is automatically temporarily increased if a rain storm is forecast for, or received, at the geographic location.

29. The method of claim 1, wherein a sprinkling event day is automatically terminated based on a storm or storm track headed for the geographic location.

30. The method of claim 1 wherein, if a forecast rain event does not result in rainfall occurring at the geographic location, n is automatically reduced to zero.

31. A sprinkler system for delivering water to a geographic location, comprising:
the sprinkler system being programmed to deliver a desired amount of water in accordance with a predetermined fixed watering schedule comprised of watering zone start times and watering zone durations and is further programmed to deliver the desired amount of water every day unless interrupted;
a repeating variable schedule, input by a user, that contains non-sprinkling event days between sprinkling event days, and wherein a number "n" is defined as the largest number of sequential non-sprinkling event days in the schedule, and where n is at least 1, wherein the fixed watering schedule is interrupted on the non-sprinkling event days of the repeating variable schedule to prevent sprinkling on the non-sprinkling event days;
an input for receiving rainfall information indicating whether rainfall has occurred at the geographic location, the rainfall information including the date of occurrence of the rainfall at the location, wherein the rainfall information is radar-based and historical or forecast; and
a processor programmed to automatically shift the repeating variable schedule so that the next sprinkling event day in the repeating variable schedule occurs n days from the date of occurrence of the rainfall, thereby ensuring that the location receives either a sprinkling event or a rainfall event capable of providing the desired amount of water at least every n days.

32. The system of claim 31, wherein the predetermined fixed watering schedule is delayed by at least one full day if the rainfall information indicates a significant rain event.

33. The system of claim 31, wherein multiple no-rain watering schedules are in effect for different daily time periods.

34. The system of claim 31, wherein the predetermined fixed watering schedule is delayed if rainfall information indicates that the desired amount of water has been received in the last 1 to 7 days.

35. The system of claim 31, wherein the predetermined fixed watering schedule is delayed if the rainfall information forecasts a high probability that the desired amount of water will be received as rainfall in the next 1 to 24 hours.

36. The system of claim 31, wherein the predetermined fixed watering schedule is delayed if an area forecast indicates that there is a strong probability of a significant rain event in the next 24 hours, or if weather radar indicates an existing or oncoming storm.

37. The system of claim 31, wherein the rainfall information is a combination of historical and forecast information.

38. The system of claim 31, wherein the predetermined fixed watering schedule is immediately delayed upon the occurrence of a significant rain event.

39. The system of claim 31, wherein the rainfall information is derived through the Internet.

40. The system of claim 31, wherein the rainfall information includes soil moisture data associated with the geographic area.

41. The system of claim 31, wherein the rainfall information includes rain gauge data associated with the geographic area.

42. The system of claim 31, wherein Zip Code information is used to determine the geographic area associated with the sprinkler system.

43. The system of claim 31, wherein:
the sprinkler system has a rain sensor input; and including an interface to the rain sensor input operative to follow or shift the repeating variable schedule in accordance with the signal received to interrupt the sprinkler system.

44. The system of claim 31, wherein:
the repeating variable schedule has the form: do not water for x days, then water on the next day; and the shift of the-repeating variable schedule has the form: do not water for x+n days, then water on the next day, where n is between 1 and 7.

45. The system of claim 31, wherein the desired amount of water, the repeating variable schedule, or both, are determined through empirical observation associated with the effectiveness of the sprinkler system.

46. The system of claim 31, wherein the desired amount of water, the repeating variable schedule, or both, are determined through soil type, vegetation type, climate or other information with the geographic area.

47. The system of claim 31, wherein at least the processor is located at a remote site to control a plurality of sprinkler systems in the same or different geographic areas.

48. The system of claim 31, further including: an interface for receiving a signal to inhibit watering by the sprinkler system in accordance with the repeating variable schedule; and
wherein a scheduler of the sprinkler system is programmed to deliver a desired amount of water on a daily basis unless inhibited by the signal.

49. The system of claim 48, wherein the signal to inhibit the sprinkler system is sent from a geographically remote site.

50. The system of claim 48, wherein the sprinkler system is interrupted on a daily basis.

51. The system of claim 48, wherein:
the sprinkler system is an electromechanical sprinkler system including a rotating dial with adjustable pins; and the pins are adjusted to deliver the desired amount of water every day.

52. The system of claim 48, wherein:
the sprinkler system is an electronic sprinkler system including a programming interface;
and the system is reprogrammed through the interface, responsive to the signal, to deliver the desired amount of water every sprinkling event day in accordance with the repeating variable schedule.

53. The system of claim 48, wherein:
the sprinkler system is an electronic sprinkler system including a programming interface enabling a plurality of different timing programs to be set for different watering zones; and the different timing programs are reprogrammed through the interface to deliver the desired amount of water to each of the different watering zones on a daily basis in accordance with the repeating variable schedule.

54. The system of claim 48, including apparatus to interrupt electrical power to the sprinkler system in accordance with the signal received.

55. The system of claim 48, wherein the signal to interrupt inhibit the sprinkler system is delivered via the Internet.

56. The system of claim 48, including an electronic module at the location of the sprinkler system interfaced to the Internet; and
wirelessly transmitting the signal to inhibit the sprinkler system from the electronic module to the sprinkler system.

57. The system of claim 48, wherein the signal to inhibit the sprinkler system is sent via a dial-up telephone connection.

58. The system of claim 48, wherein the signal to interrupt inhibit the sprinkler system uses a recognized phone number.

59. The system of claim 31, wherein n is automatically temporarily increased if a rain storm is forecast for, or received, at the geographic location.

60. The system of claim 31, wherein a sprinkling event day is automatically terminated based on a storm or storm track headed for the geographic location.

61. The system of claim 31 wherein, if a forecast rain event does not result in rainfall occurring at the geographic location, n is automatically reduced to zero if it has already been the maximum number of sequential non-sprinkling event days since either the last rainfall or the last sprinkling event day.

* * * * *